US006835677B2

(12) United States Patent
McCabe et al.

(10) Patent No.: US 6,835,677 B2
(45) Date of Patent: Dec. 28, 2004

(54) COMPOSITE FOR USE IN THE MANUFACTURE OF TRANSPORTATION VEHICLE SEATING TRIM

(75) Inventors: William G. McCabe, Greenwood, SC (US); David Wenstrup, Easley, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/368,302

(22) Filed: Feb. 18, 2003

(65) Prior Publication Data

US 2003/0176127 A1 Sep. 18, 2003

Related U.S. Application Data

(63) Continuation of application No. 09/504,827, filed on Feb. 16, 2000, now abandoned.

(51) Int. Cl.$^7$ .............................. B32B 5/26; B32B 27/12
(52) U.S. Cl. ...................... 442/149; 442/164; 442/268; 442/277; 442/281; 442/283
(58) Field of Search ................................ 442/149, 164, 442/268, 277, 281, 283, 208, 212, 216, 235

(56) References Cited

U.S. PATENT DOCUMENTS

| 4,831,664 A | 5/1989 | Suda ................................ 2/2 |
| 5,747,393 A | 5/1998 | Eckel et al. ................. 442/272 |
| 5,951,798 A | 9/1999 | Schmidt et al. ............. 156/148 |
| 6,322,658 B1 | 11/2001 | Byma et al. ............. 756/309.9 |

FOREIGN PATENT DOCUMENTS

| EP | 0 469 309 | 2/1992 |
| EP | 0 529 671 | 3/1993 |
| WO | WO 99 42330 | 8/1999 |

OTHER PUBLICATIONS

European Patent Office, International Search Report for PCT/US01/05004, Oct. 10, 2001.

*Primary Examiner*—Ula Ruddock
(74) *Attorney, Agent, or Firm*—Terry T. Moyer; Jeffery E. Bacon

(57) ABSTRACT

A composite fabric for use as a replacement for vinyl transportation vehicle seating trim is described. The composite includes a woven fabric bonded to a nonwoven substrate, and is desirably substantially all-polyester. The composite has physical properties superior to that of conventional vinyl materials, yet is lighter weight. In addition, the composite is readily and efficiently recyclable.

13 Claims, No Drawings

COMPOSITE FOR USE IN THE MANUFACTURE OF TRANSPORTATION VEHICLE SEATING TRIM

CROSS REFERENCE TO RELATED APPLICATION

This application is a continuation of U.S. patent application Ser. No. 09/504,827, entitled "Composite For Use in the Manufacture of Transportation Vehicle Seating Trim", filed on Feb. 16, 2000, now abandoned.

FIELD OF THE INVENTION

The invention generally relates to textile composites particularly useful in the formation of trim for seating in transportation vehicles. More specifically, the invention relates to textile composites which are useful as a replacement for the vinyl materials conventionally used in the manufacture of transportation vehicle seating and the like.

BACKGROUND OF THE INVENTION

Transportation vehicles such as cars, trucks, etc., typically have seats which are covered with some form of durable material designed to withstand a variety of forces. The seats commonly include a platform (the part that the user contacts when he sits on the seat), the seat back (the part which faces the passenger sitting behind the seat), the skirt (the part which extends substantially vertically downward from the platform), and the sides, which connect all of the seat parts together. In most transportation vehicle seats, the primary emphasis is placed on the selection of the material for the platform, as this is the aesthetic focus of the seat within the vehicle.

Common materials for the platform of such vehicle seats include leather and cloth, such as woven fabrics, knit fabrics and the like. In the case of cloth seats, the fabrics used are typically selected to be heavy and highly decorative. Such decoration can be achieved through the use of a plurality of colored yarns, printing or dyeing of the materials, specific fabric constructions, pile surfaces, etc. Where woven fabrics are used to form the platform of the seat, they have typically included a heavy material (e.g. on the order of about 8.5 to 19.0 oz/sq yd) bonded to a polyurethane foam material, or a nonwoven backing formed from a wool/polyester or polypropylene/linen blend. Such backings are typically secured to the fabric layer by way of polyurethane adhesives.

The remaining portions of the vehicle seats are collectively referred to herein as the seating trim. Such items of vehicle seating are typically made from vinyl material, even where natural leather has been used to form the seat platform.

Some considerations that vehicle seating fabric manufacturers must take into account when designing the fabrics are the particular physical parameters which must be achieved. For example, automobile manufacturers typically require that fabrics (materials) used for their seats have high breaking and tear strength (typically on the order of about 270 N–489 N in each of the warp and fill directions when measured according to ASTM D 5034 and ASTM D 1117, respectively), and seam strengths of at least about 289 N–310 N, when tested according to Ford Laboratory Test Method ("FLTM") BN 119-01.

Furthermore, it is typically desired for the materials to have stretch of at least about 4%×4% (warp×fill for flat woven fabrics, and 5%×5% for woven velour fabrics) when measured according to Society of Automotive Engineers Test Method SAE J855 and fog of greater than about 70 when tested according to FLTM BO 131-01. (As will be readily appreciated by those of ordinary skill in the art, the term "fog" refers to the amount of matter which would evaporate and build up on the interior of automobile glass as given off by the interior car components).

In addition, the materials must have at least minimal resistance to UV degradation, in order that they can withstand extended periods of direct sunlight. Furthermore, if the fabrics are formed from a plurality of laminated layers, they generally must have a lamination bond strength of at least about 12 N when tested according to FLTM BN 151-05 Method A. In addition, the performance characteristics of the platform materials must be retained throughout a wide range of temperatures and temperature changes, since vehicles can heat up rapidly in the sun and become extremely cold in response to frigid external temperatures.

As noted above, developments have heretofore typically been directed to perfecting the performance and appearance of seat platforms of transportation vehicles, while little attention has been paid to the vehicle trim. This is believed in part to be due to the ready availability, low cost, and adequate performance typically associated with commercially available vinyl trim materials.

One alternative which the assignee of the instant invention has developed for use as a vinyl replacement material is a woven fabric material having a polyurethane foam backing. As illustrated more fully in the examples below, the polyurethane-backed fabric had similar fog to vinyl, greater breaking strength, and good tear and seam strength.

DETAILED DESCRIPTION

In the following detailed description of the invention, specific preferred embodiments of the invention are described to enable a full and complete understanding of the invention. It will be recognized that it is not intended to limit the invention to the particular preferred embodiment described, and although specific terms are employed in describing the invention, such terms are used in a descriptive sense for the purpose of illustration and not for the purpose of limitation.

The instant invention is directed to a fabric composite which can be used as a substitute for conventional vinyl trim materials. More specifically, the invention describes a composite which provides superior performance capabilities as compared with conventional vinyl trim materials, while also providing an enhanced aesthetic appearance. Furthermore, the composite of the instant invention is readily and efficiently recyclable, without the need for separation of the material inputs.

In addition, the material of the instant invention achieves performance results superior in nature to the conventional vinyl trim materials, and at a lower weight. This is of particular advantage in that transportation vehicle manufacturers are constantly trying to reduce the weight associated with the interior of their vehicles in order to maximize fuel efficiency and load capacity.

The instant invention is directed to a composite having a fabric which is bonded to a nonwoven substrate. In a preferred form of the invention, the fabric is substantially all-polyester, as is the nonwoven substrate. In a particularly preferred form of the invention, the fabric is bonded to the nonwoven substrate by way of a polyester adhesive, preferably of the low melt, low viscosity (e.g., having a melting point of 115–180° C. and a viscosity of 20,000–150,000 c.p.) variety.

The overall fabric composite is desirably light weight, preferably on the order of about 9.0 to about 20.0 oz/sq yd, and more preferably less than about 12 oz/sq yd. (As will be readily appreciated, the overall weight will depend on the weight of the backing used as well as that of the fabric and adhesive.) Of this overall weight, the fabric desirably has a weight of about 4.5 oz/sq yd to about 8.0 oz/sq yd, and more preferably less than about 6 oz/sq yd, and the nonwoven substrate has a weight of about 3 oz/sq yd to about 12.0 oz/sq yd, and more preferably about 4 oz/sq yd. The adhesives are desirably applied at a level of about 5–30 $g/m^2$, and more preferably at about 12–15 $g/m^2$.

The composite desirably has a fog of about 80 or greater, even more preferably about 90 or greater, and even more preferably about 95 or greater. As noted above, the fog value is an indicator of the amount of matter which would evaporate and build up on the glass components of the vehicle. The higher the fog number the lower the amount of matter which would come off the material, with 100 being the highest number possible (indicating no matter comes off the material).

In addition, the breaking strength is significantly greater than that of vinyl or the prior composite construction. Furthermore the composite has higher elasticity, a stronger lamination bond compared to that of the prior composite construction, and a lighter weight than conventional vinyl materials.

As noted above, in a preferred form of the invention, the fabric, nonwoven substrate, and adhesive securing the layers together are all formed from polyester. As will be recognized by those of ordinary skill in the art, products which are 95% polyester can be classified as 100% recyclable. However, additional processing is required during the recycling operation to separate the non-polyester component of the material being recycled. Therefore, this preferred form of the invention enables the ready recyclability of the trim material without the added expense of the additional non-polyester component removal operation.

An additional feature required by most transportation vehicle seat covering materials is that they be flame retardant. To achieve this performance characteristic, manufacturers typically include a flame retardant within the polyurethane component of their seating and trim materials. However, the need for such flame retardants can be eliminated in the preferred embodiment of the composite of the instant invention, due to the self-extinguishing nature of the polyester used to form the components.

As noted above, the composite desirably includes a layer of lightweight woven polyester fabric. The fabric is preferably flat woven from textured polyester yarns. The composite also includes a nonwoven substrate layer, which is also preferably made from polyester. In a particularly preferred form of the invention, the nonwoven material is a needled polyester fabric made from fibers 4–15 denier in size. However, thermoset and other types of nonwoven materials could also be used within the scope of the instant invention.

The fabric layer is secured to the nonwoven substrate by way of an adhesive layer. In a preferred form of the invention, the adhesive is a polyester adhesive, preferably of the low melt, low viscosity variety. For example, polyester adhesives having a melt point of about 140° C. have been found to perform well in the invention.

The adhesive can be applied to the fabric or the nonwoven substrate in any conventional manner. For example, it can be applied to one of the components by foaming, extruding, screen printing, or the like. The adhesive can be applied continuously across the surface of the fabric and/or nonwoven substrate or in a spaced arrangement, such as a zebra-type configuration. In addition, the fabric could be backcoated, such as with an ethyl vinyl alcohol compound, to control the amount of stretch in the overall composite.

EXAMPLES

Sample A—A conventional vinyl automotive seating trim material was obtained. The material had a weight of 20 oz/sq yd.

Sample B—A sample of the assignee's prior vinyl trim replacement material was also obtained and tested. The material had an overall composite weight of 10 oz/sq yd, and included a woven fabric having a weight of 5.2 oz/sq yd, a backcoat of ethyl vinyl alcohol having a weight of 0.75 oz/sq yd, and a polyurethane foam backing material bonded to it. The polyurethane foam backing material had a weight of 4.8 oz/sq yd, and was bonded to the backcoated fabric by a flame lamination process, such processes being readily understood by those having ordinary skill in the art.

Sample C—A composite material was produced according to the instant invention. The composite material had an overall weight of 9.5 oz/sq yd, and was formed from a plain woven (59 ends×45 picks greige, 73 ends×50 picks finished) all polyester fabric having a weight of 5.2 oz/sq yd bonded to a nonwoven substrate having a weight of 4.0 oz/sq yd. The fabric was bonded to the nonwoven substrate using a hot melt, low viscosity polyester adhesive applied according to conventional hot melt application methods at a rate of 12–15 $g/m^2$ in a zebra-type pattern.

Each of the materials were tested for fog, breaking strength, tear strength, seam strength, stretch and lamination bond as described below. The results are recorded in Table A.

Fog: Fog was tested according to Ford Laboratory Test Method BO 131-01.

Breaking Strength: Breaking strength was tested according to ASTM D 5034.

Tear Strength: Tear strength was tested according to ASTM D 1117.

Seam Strength: Seam strength was tested according to Ford Laboratory Test Method BN 119-01.

Stretch: Stretch was tested according to Society of Automotive Engineers test method J855.

Lamination Bond: Lamination bond strength was tested according to Ford Laboratory Test Method BN 151-05 Method A.

TABLE A

| Fabric Test | Sample A | Sample B | Sample C |
| --- | --- | --- | --- |
| Fog | 72.69 | 72.3 | 95.86 |
| Breaking Strength | 502 N × 566 N | 1328 N × 951 N | 1414 N × 1043 N |
| Tear Strength | 208 N × 83 N | 206 N × 161 N | 395 N × 346 N |
| Seam Strength | 497 N × 653 N | 641 N × 765 N | 649 N × 782 N |
| Stretch | 21% × 37% | 3% × 0% | 13% × 21% |
| Lamination Bond | Not tested | 14.6 N × 15.2 N | 28.9 N × 26.6 N |

As illustrated, the composite fabric of the instant invention had superior fog performance to that of the prior trim materials, as well as superior breaking strength and tear strength. Furthermore, the composites achieved the superior performance characteristics at a lower weight than with prior constructions. As a further advantage, the composite of the instant invention can be readily and efficiently recycled, due to its substantially all polyester construction.

In the specification there has been set forth a preferred embodiment of the invention, and although specific terms are employed, they are used in a generic and descriptive sense only and not for purpose of limitation, the scope of the invention being defined in the claims.

We claim:

1. A composite for use in the manufacture of seating trim in transportation vehicles comprising:

a woven polyester fabric having a weight of about 4.5 to about 8 oz/sq yd;

a polyester non-woven substrate having a weight of about 3 to about 12 oz/sq yd, a polyester adhesive securing said woven polyester fabric to said non-woven substrate, wherein said polyester adhesive includes a melting point of from about 115° C. to about 180° C. and is applied at a level of about 5 to about 30 g/m$^2$; and whereby the woven polyester fabric secured to the polyester non-woven substrate by the polyester adhesive has a back coating of an ethyl vinyl alcohol compound.

2. A composite according to claim 1, wherein said non-woven substrate consists essentially of polyester fibers.

3. A composite according to claim 1, wherein said non-woven substrate consists essentially of polyester fibers and said composite is substantially all-polyester.

4. A composite according to claim 1, wherein said woven polyester fabric comprises a flat woven fabric having a weight of less than about 6 oz/sq yd.

5. A composite according to claim 1, wherein said non-woven substrate has a weight of about 4-oz/sq yd.

6. A composite according to claim 1, wherein said composite has an overall weight of about 9 to about 20 oz/sq yd.

7. A composite according to claim 1, wherein said adhesive is provided between said woven fabric layer and said non-woven substrate in a plurality of discrete locations.

8. A composite according to claim 1, wherein said polyester adhesive extends substantially continuously between said woven fabric layer and said polyester non-woven substrate.

9. A composite according to claim 1, wherein said composite has a fog value of about 80 to about 100 when tested according to SAE J1351.

10. A composite according to claim 1, wherein said composite has a breaking strength of about 1350 N or greater in the warp direction, and a breaking strength of about 1000 N or greater in the fill direction when tested according to ASTM D 5034.

11. A composite according to claim 1, wherein said composite has a tear strength of about 250 N or greater in the warp direction, and about 175 or greater in the fill direction when tested according to ASTM D 1117.

12. A composite according to claim 1, wherein said composite has stretch of about 5% or greater in the warp direction and about 15% or greater in the fill direction when tested according to SAE J855.

13. A composite according to claim 1, wherein said composite has a lamination bond strength of about 20 N or greater in each of the warp and fill directions.

* * * * *